(12) United States Patent
McBrearty et al.

(10) Patent No.: US 7,460,883 B1
(45) Date of Patent: Dec. 2, 2008

(54) KIDS CELL PHONE BUTTON THAT CALLS THE CLOSEST PARENT OR RELATIVE

(75) Inventors: Gerald F. McBrearty, Austin, TX (US); Johnny M. Shieh, Austin, TX (US); Susann M. Keohane, Austin, TX (US); Jessica C. Murillo, Round Rock, TX (US); Shawn P. Mullen, Buda, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/025,035

(22) Filed: Feb. 3, 2008

(51) Int. Cl.
*H04M 1/00* (2006.01)

(52) U.S. Cl. ............... 455/550.1; 455/90.1; 455/414.1; 455/417; 455/418; 455/456.1

(58) Field of Classification Search ............. 455/90.1, 455/414.1, 417, 418, 456.1, 550.1
See application file for complete search history.

(56) References Cited

U.S. PATENT DOCUMENTS

| | | | | |
|---|---|---|---|---|
| 5,805,689 | A * | 9/1998 | Neville | 379/220.01 |
| 5,825,283 | A * | 10/1998 | Camhi | 340/438 |
| 6,067,356 | A * | 5/2000 | Lautenschlager et al. | 379/201.01 |
| 6,078,260 | A * | 6/2000 | Desch | 340/573.1 |
| 6,167,064 | A * | 12/2000 | Cohn et al. | 370/522 |
| 6,486,777 | B2 * | 11/2002 | Clark | 340/539.1 |
| 6,785,387 | B1 | 8/2004 | Albrecht et al. | |
| 6,826,120 | B1 | 11/2004 | Decker et al. | |
| 6,912,399 | B2 * | 6/2005 | Zirul et al. | 455/463 |
| 6,924,741 | B2 * | 8/2005 | Tamayama et al. | 340/572.1 |
| 7,012,534 | B2 * | 3/2006 | Chaco | 340/573.1 |
| 7,092,695 | B1 | 8/2006 | Boling et al. | |
| 7,302,272 | B2 * | 11/2007 | Ackley | 455/466 |
| 7,317,927 | B2 * | 1/2008 | Staton et al. | 455/456.4 |
| 7,353,034 | B2 * | 4/2008 | Haney | 455/457 |
| 2003/0013449 | A1 * | 1/2003 | Hose et al. | 455/440 |
| 2004/0132480 | A1 | 7/2004 | Parker et al. | |
| 2005/0026644 | A1 | 2/2005 | Lien | |
| 2006/0135087 | A1 | 6/2006 | Azzaro | |
| 2006/0208878 | A1 | 9/2006 | Nowlan | |
| 2007/0265032 | A1 | 11/2007 | Aisenberg | |

OTHER PUBLICATIONS

"Stay connected: Best cell phones for child," Herb Weisbaum, MSNBC contributor, MSNBC.com, Dec. 16, 2006.

* cited by examiner

*Primary Examiner*—Stephen M D'Agosta
(74) *Attorney, Agent, or Firm*—Carpenter & Assoc.; Robert K. Carpenter

(57) ABSTRACT

A cellular telephone system that is part of a call network, includes: a first, second, and at least a third cellular telephones; the first cellular telephone including a first button for activating a call to the second telephone and at least a second button for activating a call to the at least third telephone, the first telephone further including green and red color coding of each of the first button and at least the second button such that a closest one of either (a) the second telephone, or (b) a closest one of the at least a third telephone, will have a button indicated by green coding and other button(s) by red; and where the first telephone can query the call network for the location of said closest cellular telephone, closest measured by at least one of geographically, by driving time, and by driving distance.

1 Claim, 1 Drawing Sheet

KIDS CELL PHONE BUTTON THAT CALLS THE CLOSEST PARENT OR RELATIVE

CROSS-REFERENCE TO RELATED APPLICATIONS (Not Applicable)

Figure 1:
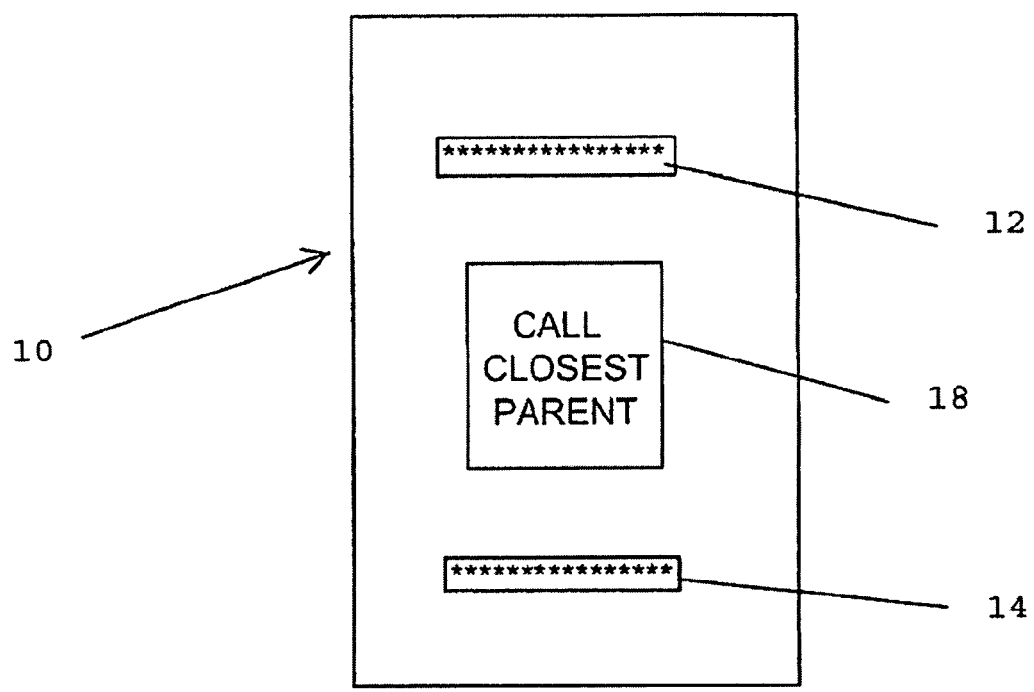

STATEMENT REGARDING FEDERALLY SPONSORED RESEARCH OR DEVELOPMENT (Not Applicable)

THE NAMES OF THE PARTY TO A JOINT RESEARCH AGREEMENT (Not Applicable)

INCORPORATION-BY-REFERENCE OF MATERIAL SUBMITTED ON A COMPACT DISC (Not Applicable)

BACKGROUND OF THE INVENTION (1) Field of the Invention

This disclosure is directed to a cellular telephone for a child that includes a button, that when pushed, calls the cellular telephone of only the parent (or other relative) closest to the child.

(2) Description of Related Art Including Information Submitted under 37 CFR 1.97 and 1.98

Nowlan (U.S. Published Patent Application No. 20060208878) discloses, in paragraphs [0012] and [0013] that "[i]n a typical scenario, a child wears a small pendant or bracelet that includes location capabilities, such as a GPS system. This device has been entrained to wireless devices owned by both parents in a secure fashion. Either parent can send a wireless message to the device, and the device will return its current location in the form of GPS coordinates, which would be displayed as a map, address, or navigational information on the parent's wireless device. In addition, the device would have a dedicated activation button or switch. When pressed, this button would send a request for a pre-defined service for the child, such as to be picked up (i.e. from a play date, soccer practice, school event, etc.). This request would be received by all enabled wireless devices in the secure domain, and would be time stamped and also contain current location information. Either parent could acknowledge the request. If the request was acknowledged by one device, all other devices would automatically be sent a notice indicating the request had been serviced. If multiple acknowledgements are received, the closest one would be confirmed as the acknowledger, and all other devices would again be sent a notice indicating the request had been serviced. The acknowledging device would then compute a route to the child devices location using either a device based or network based navigation application. Finally, when the parent arrives at the location (or a close enough proximity), the child's device would be sent a simple signal that the pickup had arrived (this could be a visual, auditory, or tactile alert for example)."

Other communications devices for children are known. See for examples, Decker et al. (U.S. Pat. No. 6,826,120) and Azzaro (US Published Patent Application No. 20060135087).

Simplified cellular telephones are also known. See for examples, U.S. patents and Published patent applications to Aisenberg (US 20070265032), Zirul et al. (U.S. Pat. No. 6,912,399), Albrecht et al. (U.S. Pat. No. 6,785,387), Lien (US 20050026644), and Parker et al. (U.S. 20040132480).

BRIEF SUMMARY OF THE INVENTION

Aspects of this disclosure are directed to a cellular telephone system that is part of a call network, including: a first cellular telephone for a child; a second cellular telephone for a first relative of the child; at least a third cellular telephone for at least a second relative of the child; the first cellular telephone including a first button for activating a call to the second cellular telephone and at least a second button for activating a call to the at least a third cellular telephone, the first cellular telephone further including green and red color coding of each of the first button and at least the second button such that a closest one of either (a) the second cellular telephone, or (b) a closest one of the at least a third cellular telephone, will have a button indicated by green coding and the other button or buttons will be indicated by red; and where the first cellular telephone can query the call network for the location of said closest cellular telephone, and closest is measured by at least one of closest geographically, closest by driving time, and closest by driving distance.

Additional aspects of this disclosure are directed to a cellular telephone system, including: a first cellular telephone for a child; a second cellular telephone for the child's mother; and a third cellular telephone for the child's father; the first cellular telephone including a single button that, when pushed or otherwise activated, automatically activates a call only to the geographically closer of the second cellular telephone and the third cellular telephone.

Aspects of this disclosure are also directed to a method of operating a child's telephone that includes a single button that, when pushed or otherwise activated, automatically activates a call only to the geographically closer of the child's mother's cellular telephone and the child's father's cellular telephone.

Aspects of this disclosure are also directed to a child's cellular telephone that includes a single button that, when pushed or otherwise activated, automatically activates a call only to the geographically closer of the child's mother's cellular telephone and the child's father's cellular telephone.

Other aspects of this disclosure can be directed to systems, methods, and apparatuses that, in addition to (or instead of one or both of) the mother's and father's cellular phones, can telephone only the closest of any selected relatives' cellular telephones. For example, the child's cellular telephone can have a button that, when pushed or otherwise activated, automatically activates a call only to the geographically closer of the child's mother's, father's, brothers' or sisters' cellular telephones.

Additionally, the closest parent or other relative that is called can be the closest geographically (straight line from cellular telephone to cellular telephone), or alternatively the closest by driving time or alternatively closest by driving distance. In some embodiments, the child's cellular telephone could be programmed to automatically utilize one of the closest geographically, closest by driving distance, or closest by driving time. In other embodiments, the child's phone could have a different button, or other activator, for each of closest geographically, closest by driving time and closest by driving distance.

Other exemplary embodiments and advantages of this disclosure can be ascertained by reviewing the present disclosure and the accompanying drawings.

BRIEF DESCRIPTION OF THE SEVERAL VIEWS OF THE DRAWING(S)

Figure 2:
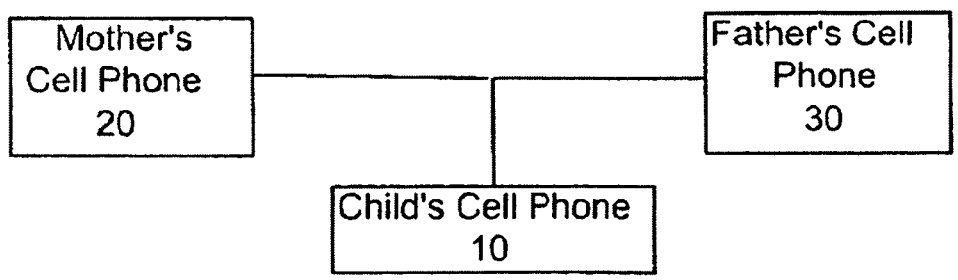

This disclosure is further described in the detailed description that follows, with reference to the drawings, in which:

FIG. 1 shows a cellular telephone for a child in according to at least some aspects of this disclosure; and FIG. 2 shows a cellular telephone system including the cellular telephone of FIG. 1 according to at least some aspects of this disclosure.

DETAILED DESCRIPTION OF THE INVENTION

Exemplary embodiments of this disclosure are described herein by way of example.

In particular, this disclosure is directed to a cellular telephone system including a cellular telephone for a child, such as for example child's cellular telephone 10 of FIG. 1. In addition to speaker 12 and microphone 14, the child's cellular telephone includes a "CALL CLOSEST PARENT" button (or other activation device) 18. While FIG. 1 shows an embodiment only having the "CALL CLOSEST PARENT" button (or other activation device) 18, other embodiments can include other buttons (or other activation devices) on the telephone 10, such as regular numbers for dialing or "CALL MOM" or "CALL DAD" or "CALL 911" and the like.

While there are a number of cellular telephones intended for children, these cellular telephones have several buttons, such as Emergency to dial 911, Parent1, Parent2. However a child must then select a parent to call in order to determine who is the nearest parent or the parents must then call each other to determine who is nearest to the child in order to pick the child up.

This disclosure is directed to a single button 18 on the cellular telephone that will, when pressed, call only the parent whose telephone is nearest the child's telephone (or, alternatively, as discussed above closest by driving distance or driving time). The global positioning satellite (GPS) location of the child's telephone is utilized to determine the closest GPS location of one of the parents telephones and then the closest parent's telephone is automatically called via the button for calling the closest parent. In at least one embodiment, the cellular telephone provider tracks all three telephones (Child's telephone 10, Parent1 or Mother's telephone 20, and Parent2 or Father's telephone 30, as illustrated in FIG. 2) and, when the child presses the "CALL NEAREST PARENT" button, the child's telephone would be connected to the geographically nearest of the Mother's telephone 20 and the Father's telephone 30.

In some embodiments, the child's telephone would be provided with the information as to who is the nearest parent or, in other embodiments the cell phone provider would determine the closest parent's telephone at a ground station after the "CALL NEAREST PARENT" button 18 is pressed.

In another embodiment the child's cellular telephone 10 can query the cell network for the information and the telephone 10 would pick the nearest parent's telephone. Another alternate embodiment might include color coding the nearest parent's telephone on the "PARENT1" and "PARENT2" buttons as green and the further away parent as red.

Thus, the GPS location of the child's telephone and the GPS location of cellular telephones of the parents or other relatives are utilized to automatically dial the nearest parent's (or other relative's) cellular telephone.

The foregoing exemplary embodiments have been provided for the purpose of explanation and are in no way to be construed as limiting this disclosure. This disclosure is not limited to the particulars disclosed herein, but extends to all embodiments within the scope of the appended claims, and any equivalents thereof.

The invention claimed is:

1. A cellular telephone system that is part of a call network, comprising:
    a first cellular telephone for a child;
    a second cellular telephone for a first relative of the child;
    at least a third cellular telephone for at least a second relative of the child;
    the first cellular telephone comprising a first button for activating a call to the second cellular telephone and at least a second button for activating a call to the at least a third cellular telephone,
    the first cellular telephone further comprising green and red color coding of each of the first button and at least the second button such that a closest one of either (a) the second cellular telephone, or (b) a closest one of the at least a third cellular telephone, will have a button indicated by green coding and the other button or buttons will be indicated by red; and
    wherein the first cellular telephone can query the call network for the location of said closest cellular telephone, and closest is measured by at least one of closest geographically, closest by driving time, and closest by driving distance.

* * * * *